United States Patent [19]
Timrot et al.

[11] 3,746,980
[45] July 17, 1973

[54] METHOD AND APPARATUS FOR MEASURING CHARACTERISTICS OF ELECTRIC CIRCUITS

[76] Inventors: Dmitry Lvovich Timrot, Zhigulevskaya ulitsa, 30, kv. 32; Viktor Vladimirovich Makhrov, Saratovskaya ulitsa, 14/1, kv. 264, both of Moscow, U.S.S.R.

[22] Filed: Aug. 16, 1971

[21] Appl. No.: 172,082

[52] U.S. Cl. ........................ 324/65 R, 324/DIG. 1
[51] Int. Cl. ........................................... G01r 27/02
[58] Field of Search .............. 324/65 R, 64, DIG. 1, 324/62

[56] References Cited
UNITED STATES PATENTS

| | | |
|---|---|---|
| 2,164,701 | 7/1939 | Cohen ........................ 324/DIG. 1 |
| 2,611,268 | 9/1952 | Mellen ........................ 324/DIG. 1 |
| 2,623,916 | 12/1952 | Welz ........................... 324/DIG. 1 |
| 2,649,571 | 8/1953 | Smith .......................... 324/DIG. 1 |
| 3,209,248 | 9/1965 | Siefert ........................... 324/65 R |
| 3,286,174 | 11/1966 | Schaschl ........................ 324/65 R |

*Primary Examiner*—Stanley T. Krawczewicz
*Attorney*—Eric H. Waters, John G. Schwartz and J. Harold Nissen

[57] ABSTRACT

Method and apparatus for measuring characteristics of an electric circuit. The method comprises the steps of connecting an adjustable voltage source to the opposite end terminals of a shunted portion of said electric circuit; connecting an additional adjustable voltage source to one part of the shunting circuit; operating said voltage sources to create such voltage drops across said shunted portion circuit and across said one part of the shunting, that no electric current flows through the remaining part of said shunting circuit; and then measuring the electric characteristics of said shunted portion of said electric circuit. The apparatus is useful for measuring the thermal characteristics of aggressive fluids contained within a closed metal vessel, comprising a element included in a measuring circuit, wherein the leads of said element are electrically connected to the internal surface of said vessel, said measuring circuit being connected to the external surface of said vessel at points located, respectively, adjacent to the points of connection of said leads of said element, there being connected intermediate of one of said points of the connection of said circuit and an arbitrary point on said external surface a compensating circuit including an adjustable voltage source, and a galvanometer connected intermediate of said arbitrary point and the other one of said points of the connection of said measuring circuit.

5 Claims, 7 Drawing Figures

METHOD AND APPARATUS FOR MEASURING CHARACTERISTICS OF ELECTRIC CIRCUITS

The present invention relates to electric measuring techniques, and, more particularly, to methods of measuring the electric characteristics of a shunted portion of an electric circuit and to apparatus for measuring the thermal characteristics of aggressive fluids. The invention may be used for measuring the temperature of such fluids, their heat conductivity, electric conductivity and the degree of turbulence.

At present, among the most complicated problems of the measuring techniques there is the one of measuring the characteristics of aggressive fluids, brought about by the development of the chemistry of aggressive substances and by the progress of high-temperature measurement techniques. And, although the problem of measuring the pressure of aggressive fluids has been solved with the development of membrane-type pick-ups or transducers, the problem of measuring the thermal characteristics of these fluids is far from having been satisfactorily solved.

The hitherto known apparatus for measuring the thermal characteristics, e.g., the temperature of aggressive fluids (see, for example, Nikolski et al., "Teploenergetica," 1959, No. 2, 92, USSR; Sien W.H., Fillips N.S. "Physical Review," 1964, 133, A. 1370) incorporate temperature-responsive elements of different structures, which are introduced into a vessel containing an aggressive fluid in protective cases from a material resistant to the action of this fluids.

In some cases, e.g., in the cases of vapors of alkaline metals, both the closed vessel containing the aggressive fluid and the protective cases are made of metal. However, the abovementioned apparatus have a number of serious disadvantages. First, the temperature-responsive elements of these known apparatus are aft to bring distortion into the measurements on account of the losses of heat in their protective cases. Second, the known apparatus feature a great degree of thermal inertia. The attempts to reduce the thermal inertia and increase the accuracy of measurements by reducing the thickness of the walls of the protective cases have proved in most cases to be futile. However, the abovementioned distortions in some cases cannot be tolerated. For instance, thermoanemometers with temperature-responsive elements made of wire 0.05 to 0.02 mm in diameter have recently gained a wide field of applications for investigation of turbulent streams of fluids. With the temperature-responsive element of a thermoanemometer being enclosed within a protective case, the instrument would not work at all.

It is clear that an apparatus would have the greatest sensitivity and a minimal thermal inertia with the temperature-responsive element thereof positioned directly inside the aggressive fluid without any protective case.

However, positioning of a temperature-responsive element directly within a closed, or sealed metal vessel containing an aggressive fluid is complicated by the fact that in most cases it is practically impossible to choose proper insulators for leading the terminal leads of the element from this closed vessel. For instance, in vapors of alkaline metals even such proved insulators as aluminium oxide, beryllium oxide, quartz, etc. are insufficiently stable.

When the leads of the temperature-responsive element are connected directly to the internal surface of a closed metal vessel containing thereinside aggressive fluids, the temperature-responsive element becomes shunted.

There is known a method of measuring the electric characteristics of a shunted portion of an electric circuit, provided that the electric characteristics of the shunting elements are known, the calculation being carried out by the readings of measuring instruments positioned outside the shunted portion, of the circuit itself and by the known characteristics of the shunting elements (see, for instance, the book "The principles of the theory of circuits..." by G. V. Zeveke and P.A. .Ionkin, USSR, "Energia" Publishers, 1965). However, this known method has certain drawbacks that in some cases make the employment of this method impractical. First, the characteristics of the shunted portion of the electric circuit can be measured only when the values of the electric resistances of the shunting elements are known. Second, the accuracy of such measurements is greatly dependent on the accuracy of the known data concerning the parameters of the shunting elements.

It is an object of the present invention to eliminate the abovelisted disadvantages.

The present invention has for its basic aim the creation of a method of measuring the electric parameters of a shunted portion of an electric circuit, which does not necessitate the knowledge of the parameters of the shunting elements, as well as the creation of apparatus for measuring the thermal characteristics with the employment of the said method, which should feature great accuracy and low inertia.

This aim is attained in a method of measuring the electric characteristics of a shunted portion of an electric circuit, comprising, in accordance with the present invention, the steps of connecting an adjustable voltage source to the opposite terminals of said shunted portion of said electric circuit, connecting an additional adjustable voltage source to one part of the shunting circuit, operating said voltage sources to create such voltage drops across said shunted portion of said electric circuit and across said one part of said shunting circuit that no electric current flows through the remaining part of said shunting circuit, and then measuring the electric characteristics of said shunted portion of said electric circuit.

It is advisable, in the case of direct-current circuits, for said voltage drops to be equal in value and opposite in direction, and in the case of alternating-current circuits, for said voltage drops to be equal in amplitude and concurrent in phase.

The aim of the present invention is also attained in an apparatus for performing the above method and employing the same for measuring the thermal characteristics of aggressive fluids contained within a closed metal vessel, comprising a temperature-responsive element included in the measuring circuit, in which apparatus, in accordance with the invention, the electric leads of said temperature-responsive element are electrically connected with the internal surface of said closed metal vessel, said measuring circuit bein connected to the external surface of said vessel at points located, respectively, adjacent to the points of connection of said electric leads of said temperature-respective element, there being connected intermediate of one of said points of the connection of said measuring circuit and an arbitrary point on said external surface of said vessel a compensating circuit including an adjustable voltage source, a galvanometer being connected intermediate of said arbitrary point and the other one of said points of the connection of said measuring circuit.

It is advisable that in said apparatus said measuring circuit should include a reference resistor and a direct-current voltage source, connected in series, and that said compensating circuit should include a current-measuring instrument and a variable reference resistor, also connected in series, one of the electric leads of said compensating circuit being connected to said reference resistor of said measuring circuit at a point of connection of said last-mentioned resistor to said voltage source, the other one of said electric leads of said compensating circuit being connected to an arbitrary point of said external surface of said metal vessel, one of the electric leads of said galvanometer being connected to said external surface of said metal vessel at a point of connection thereto of said reference resistor of said measuring circuit.

An advantage offered by the present invention in comparison with the known methods is that, in accordance with the invention, it is possible to determine the electric characteristics of a shunted portion of an electric circuit, without knowing the parameters of the shunting elements, the accuracy of the determination depending solely on the accuracy of the measuring instruments employed.

The present invention will be further described in connection with the embodiments thereof, with reference being made to the accompanying drawings, wherein.

The aim of measuring the electric characteristics of the shunted portion of an electric circuit may be attained by the method disclosed hereinbelow.

Figure 1:
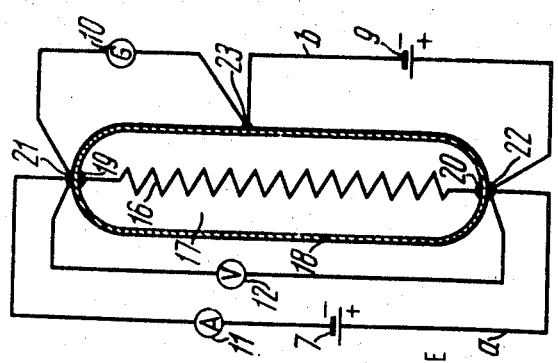
FIG. 1 shows the electric connection diagram of a shunted portion of a direct-current circuit, in accordance with the invention.

A specified portion 1 (FIG. 1) of an electric circuit is shunted by elements 2, 3 and 4. The peculiar conditions of the operation require that the measuring circuit a should be connected only into the external, unshunted portion of the electric circuit, either upstream or downstream of the points 5 and 6 of the connection thereto of the shunting elements 2, 3 and 4. Thus, let us connect to the points 5 and 6 the measuring circuit a including an adjustable voltage source 7. In this case the current from the adjustable voltage source 7 will flow both through the shunted portion 1 and through the shunting elements, 2, 3 and 4. Now let us connect to some of the shunting elements, e.g., to the elements 3 and 4, at the points 8 and 6, compensating circuit b including another adjustable voltage source 9, and let us ensure that the voltage drop produced by the last-mentioned voltage source 9 across the point 8 and 6 is equal and opposite to the voltage drop produced by the voltage source 7 across the points 5 and 6. This equality of the voltage drops we can ascertain with the help of a galvanometer 10 connected at the points 5, 8 in parallel with the remaining shunting element 2. This remaining portion 2 of the shunting elements having a definite value of electric resistance, there will be no current flowing through this portion 2 of the shunting elements, when the potentials at the end points thereof are equal to each other. In the latter case the electric current flowing through the shunted portion 1 of the electric circuit is equal in terms of its value and direction to the current flowing through the measuring circuit a. Now the electric characteristics of the shunted portion 1 of the electric circuit can be measured, e.g., by means of an ammeter 11 wired into the measuring circuit a and a voltmeter 12 connected at the points 5 and 6.

Figure 2:
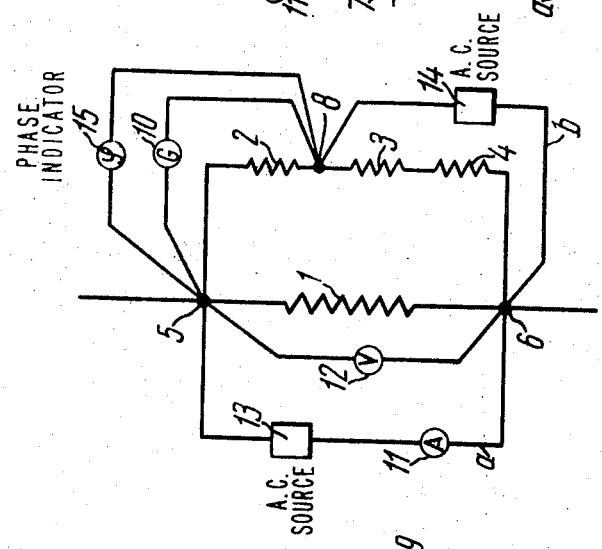
FIG. 2 shows the connection diagram of a shunted portion of an alternating-current circuit, in accordance with the invention.

Should it be necessary to measure the electric characteristics of the shunted portion 1 of an alternating-current circuit (FIG. 2), it is essential to establish, in addition to the equality of the potentials at the points 5 and 8, also the concurrence in phase of the respective voltage drops produced by the adjustable sources 13 and 14 of alternating-current voltage. The phase concurrence can be ascertained, e.g., by means of a phase indicator 15 connected to the herein described circuit at the points 5 and 8.

Figure 3:
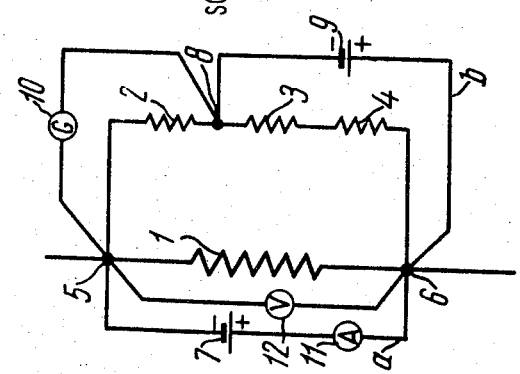
FIG. 3 illustrates an apparatus for measuring the temperature of aggressive fluids by the potentiometric method, constructed in accordance with the invention.

The apparatus for measuring the temperature of aggressive liquids and gases by the potentiometric method, illustrated in FIG. 3, comprises a temperature-respective element 16, for example, a resistance thermometer, placed directly into the medium 17 of which the temperature is to be measured, contained in a sealed metal vessel 18. The outgoing leads of the temperature-responsive element 16 are connected to the internal surface of the sealed metal vessel 18 in arbitrary points 19 and 20.

Connected to the points 21 and 22 on the external surface of the sealed metal vessel 18, which points are located, respectively, as near as possible to the connection points 19 and 20 of the temperature-responsive element 16, is the measuring circuit a including the adjustable voltage source 7 and the ammeter 11. Furthermore, connected intermediate of either one of the points of the connection of the adjustable voltage source 7. e.g., the point 22, and an arbitrary point 23 on the external surface of the sealed metal vessel 18 is the compensating circuit b including the additional adjustable voltage source 9. The galvanometer 10 is connected intermediate of the points 21 and 23, by means of which the equality of the potentials at the points 21 and 23 may be ascertained. The voltmeter 12 is connected at the points 21 and 22 to measure the voltage drop across the temperature-responsive element 16.

Figure 4:
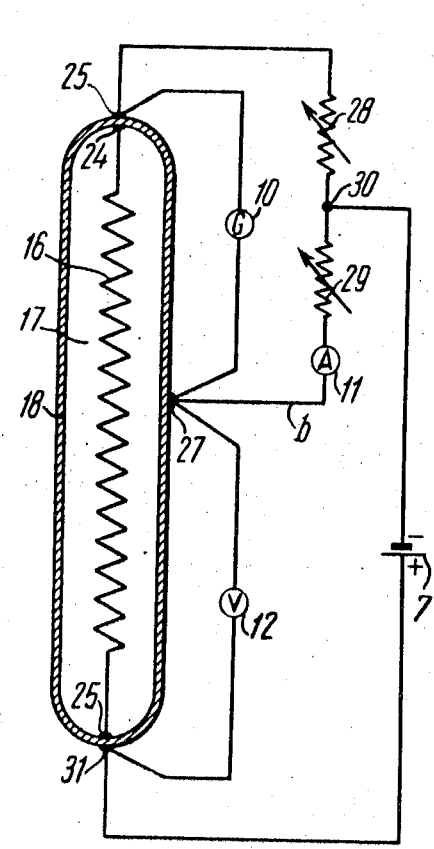
FIG. 4 illustrates an apparatus for measuring the temperature of aggressive fluids by the bridge circuit method, constructed in accordance with the invention.

The apparatus for measuring the temperature of aggressive liquids and gas by the electric bridge techniques, illustrated in FIG. 4, comprises a temperature-responsive element 16 located interiorly of a closed metal vessel 18 containing the aggressive fluid 17 thereinside. The outgoing leads of the temperature-responsive element 16 are connected to the internal surface of the vessel 18, respectively, at an arbitrary pair of points 24 and 25. The point 26 of the external surface of the sealed metal vessel 18, adjacent to the point 24, and an arbitrary point 27, also on the external surface of the vessel 18, have connected therebetween the measuring circuit $a$ which in this embodiment comprises serially connected reference variable resistors 28, 29 and a current-measuring instrument, e.g., the ammeter 11, the latter being wired into the measuring circuit $a$ on the side of the point 27. The voltage source 7 is connected intermediate of the point 30 of the measuring circuit $a$ and the point 31 on the external surface of the vessel 18, adjacent to the point 25. The voltmeter 12 is connected between the points 27 and 31 to measure the voltage drop across the points 27-31. The galvanometer 10 is connected between the points 26 and 27, whereby the equality of the potentials at these points can be ascertained.

Figure 5:
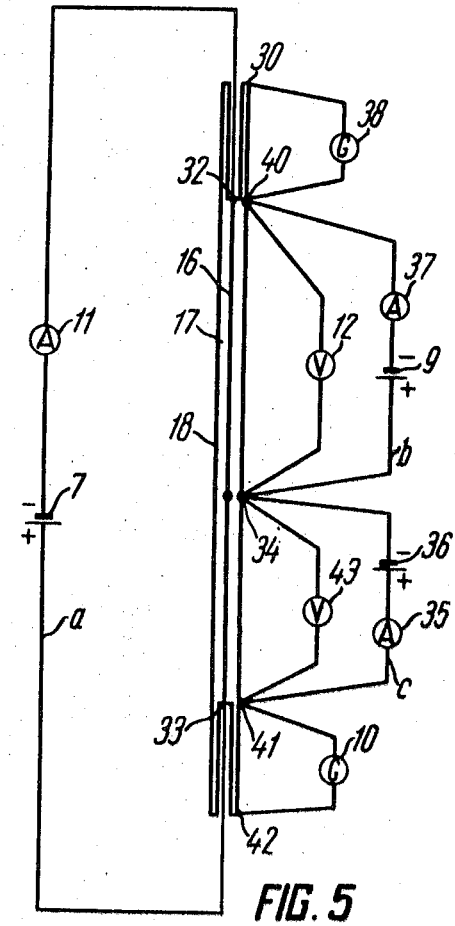
FIG. 5 illustrates an apparatus for measuring the heat conductivity factor of aggressive gases and liquids, constructed in accordance with the invention.

The apparatus for measuring the heat conductivity factor of aggressive liquids and gases by the hot-wire method, illustrated in FIG. 5, comprises a temperature-responsive element 16 in the form of a thin straight wire made of metal resistant to the action of the aggressive fluids, the elements 16 being located directly within the aggressive fluid in question, contained in a sealed metal vessel 18. The last-mentioned vessel is in the form of a thin-walled tube of a relatively small diameter, the heat-responsive element 16 being positioned interiorly of the tube and connected therewith a points 32 and 33. The heat-responsive element 16 is divided into two portions of which the ratio of the lengths is 2:1, and the point of the division is electrically connected to the vessel 18 at a point 34. The measuring circuit $a$ associated with the heat-responsive element 16 comprises serially connected adjustable voltage source 7 and current-measuring instrument 11, the opposite leads of the measuring circuit being connected to the external surface of the vessel 18 and the points 32,33, respectively. The circuits $b$ and $c$ for the creation of compensating voltage drops, in accordance with the above-disclosed method comprise, respectively, adjustable voltage sources 9 and 36 and current-measuring instruments 35, 37, these compensating circuits being connected to the vessel 18 at points 32, 33 and 34. The galvanometers 10 and 38 for ascertaining the equality of the respective electric potentials, in accordance with the above disclosed method, are connected to the vessel 18 intermediate of the points 30, 40 and 41, 42, respectively. The voltmeters 12 and 43 measuring the voltage drops have their respective leads connected to the vessel 18 at points 40, 34, 41.

Figures 6, 7:
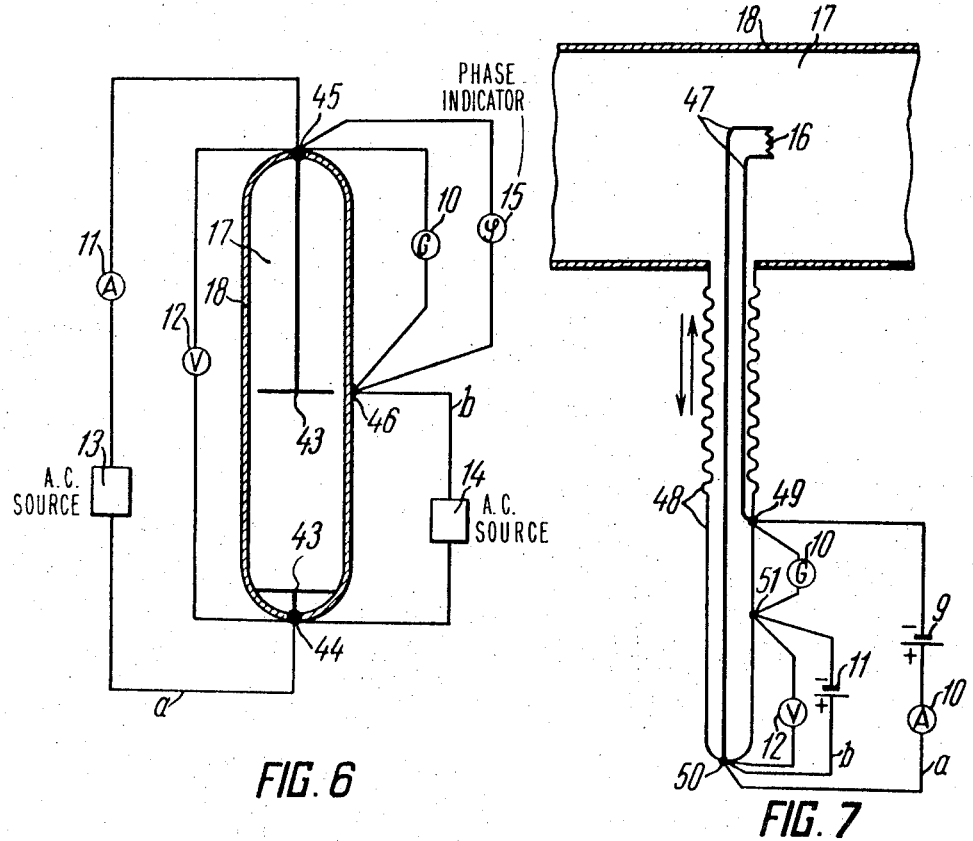
FIG. 6 illustrates an apparatus for measuring the electric conductivity of aggressive liquids and gases, constructed in accordance with the invention.
FIG. 7 illustrates an apparatus for measuring the flow rate pulsations (the degree of turbulence) of the streams of aggressive liquids and gases, constructed in accordance with the invention.

The apparatus for measuring the electric conductivity of aggressive liquids and gases, illustrated in FIG. 6, comprises an electric conductivity pickup transducer 43 including a pair of parallel spaced discs located within the aggressive fluid 17 filling a sealed metal vessel 18. The respective electric leads of the two discs are connected to the internal surface of the vessel 18 at points 44, 45. Connected intermediate of the same two points 44 and 45 on the external surface of the volume 18 is a measuring circuit $a$ including an adjustable AC voltage source 13 and a measuring instrument 11. Connected intermediate of the point 44 and an arbitrary point 46 of the vessel 18 is a compensating circuit $b$ including an additional voltage source 14. Intermediate of the points 45 and 46 on the external surface of the vessel 18 there are connected a galvanometer 10 for ascertaining the equality of the potentials at these two points and a phase indicator 15 for registration of concurrence of the phases and voltage drops created by the sources 13 and 14. The voltmeter 12 is connected to the external surface of the vessel 18 between the points 44 and 45.

The apparatus for measuring the mean rate of flow and the flow rate pulsations (the degree of turbulence) of the streams of aggressive liquids and gases, illustrated in FIG. 7, comprises a temperature-responsive element 16 in the form of a wire 0.05 to 0.02 mm in diameter, 5 to 10 mm long, made of a material resistant to the action of the aggressive fluid in question, e.g., of tungsten, the wire being located within the aggressive fluid 17 flowing interiorly of a sealed metal vessel 18. The vessel 18 may be, for instance, the flow passage portion of some fluid treating or handling apparatus. The brackets 47 supporting therebetween the heat-responsive element 16 are welded to a coordinate-bellows device 48 at points 49 and 50, respectively. To these two points, but on the external surface of the device 48, there are connected the opposite electric leads of the measuring circuit $a$ including an adjustable DC voltage source 7 and a current-measuring instrument 11, connected in series. The opposite electric leads of the compensating circuit $b$ which includes the additional adjustable voltage source 9 are connected to the points 50 and 51 on the external surface of the coordinate-bellows device 48, respectively. The points 49 and 51 of this device have connected thereto the opposite leads of the galvanometer 10 by means of which the equality of the electric potentials at these two connection points can be ascertained.

The abovedescribed apparatus for measuring the temperature of an aggressive fluid by the potentiometric method, illustrated in FIG. 3, operates as follows. Let us presume that the aggressive fluid 17 has attained a temperature $t_1$. The temperature-responsive element 16 (E.g., the resistance thermometer) being located directly within this aggressive fluid, its temperature is also $t_1$ and its electric resistance is $R_1$. In order to measure the value of this electric resistance, there is established through the measuring circuit $a$ electric current $I_1$ of a certain value. The value of the current $I_1$ is selected so as to avoid any additional heating of the temperature-responsive element 16, i.e., any overheating thereof in respect of the temperature of the aggressive fluid.

With the current acting upon the metal body of the vessel 18, there appears a potential difference between the points 21 and 22, the potential difference being equal to $U_1$. However, the values $I_1$ and $U_1$ cannot be used by themselves for the calculation of the value of the electric resistance, because the resistance is shunted by the resistance of the vessel 18, and thus only a portion of the current $I_1$ flows through the element 16.

Now the additional voltage supply source 9 of the compensating circuit $b$ is adjusted for the potential difference $U_2$ between the points 23 – 22 of the vessel 18 to be equal in the value and direction thereof to the value $U_1$. This means that the points 21 and 23 of the vessel 18 are at the same electric potential, which can be ascertained by means of the galvanometer 10. The portion of the vessel 18 intermediate of the points 21 and 23 having some definite electric resistance, the current flowing through this portion under the above circumstances would be equal to zero.

Consequently, the current flowing through the measuring circuit $a$ now equals the current flowing through the temperature-responsive element 16, and the value of this current can be measured with the help of the current-measuring instrument 11. Thus, the resistance of the element 16 can be found as $R_1 = U_1/I_1$. With the dependence of the resistance of the temperature-responsive element 16 from temperature ($R(t)$) being known, it is quite easy to determine the temperature of the aggressive fluid. The dependence of the value $R$ from temperature $t$ can be found by corresponding pre-gauging or calibrating of the temperature-responsive element 16.

The apparatus for measuring the temperature of the aggressive fluid by the bridge circuit method, illustrated in FIG. 4, operates, as follows.

The aggressive fluid within the vessel 18 has temperature $t_1$. The electric resistance of the heat-responsive element 16 depending on the temperature thereof, this resistance at the temperature $t_1$ is equal to $Rt_1$. The standard reference resistors 28 and 29 are adjusted for the potentials at the points 26 and 27 to be equal to each other. The portion of the vessel 18 intermediate of the points 26 and 27 being the diagonal connection of the bridge circuit, the equality of the above potentials makes true the following equation:

$$R_{t1} = R_1/R_2 \cdot R_3 \text{ - - - -}$$

where $R_{t1}$ is the resistance of the heat-responsive element 16 at the temperature $t_1$; $R_1$ is resistance of the reference resistor, 28, $R_2$ is the resistance of the reference resistor 29, $R_3$ is the resistance of the portion of the vessel 18 intermediate of the points 27 and 31.

The right-hand part of the above equation contains an unknown value $R_3$. However, this value can be found from the readings of current-measuring instrument 11 and voltmeter 42. Thus, $$R_{t1} = R_1/R_2 \cdot U_3/I_3$$

where $U_3$ is the value indicated by the voltmeter 12 and $I_3$ is the value indicated by the current-measuring instrument 11.

The apparatus described in connection with FIG. 4 offers certain advantages over the one illustrated in FIG. 3. More often than not the resistance of the above described portions of the metal vessel 18 would be substantially lower than that of the temperature-responsive element 16, and, therefore, even when the current through the element 16 is very low, the currents flowing through the portions of the vessel 18 would be sufficiently great. Consequently, the advantage of the apparatus illustrated in FIG. 4 is the fact that in this apparatus there is measured not the low current through the temperature-responsive element 16, but the greater current flowing through the vessel 18, which later can be measured with a greater accuracy. Therefore, the apparatus illustrated in FIG 4 features greater sensitivity, which is, by the way, characteristic of bridge circuits as such.

The apparatus for measuring the heat conductivity factor of aggressive liquids and gases by the hot wire method, illustrated in FIG. 5, operates similarly to the apparatus described in connection with FIG. 3, but with certain additional features. As it can be seen from FIG. 5, this apparatus includes in fact a pair of apparatus illustrated in FIG. 3, these two apparatus having a common point 34. The characteristic feature of the apparatus illustrated in FIG. 5 is its having a common source of the voltage supply of the two temperature-responsive portions of the element 16. In this way it becomes possible to maintain uniform thermal duties of the two portions, acting as two temperature-responsive elements, throughout the measurements. Another characteristic feature of the apparatus shown in FIG. 5 is the fact that the shunting portions of the vessel 18, defined by the points 40, 34 and 34, 41 are employed as the external resistance thermometers. The determination of the temperatures of the above mentioned elements of the apparatus shown in FIG. 5 is similar to the determination of the temperature in the apparatus illustrated in FIG. 3.

The apparatus for measuring the electric conductivity of aggressive gasses and liquids, illustrated in FIG. 6, is operated similarly to the operation of the apparatus illustrated in FIG. 3. However, when the apparatus is operated with alternating current, it is essential that the potentials as the points 45, 46 should be not only equal in value, but also concurrent in phase, The apparatus for measuring the mean flow rate and the flow rate pulsations (the degree of turbulence) of the streams of aggressive liquids and gases, illustrated in FIG. 7, is also operated similarly to the operation of the apparatus illustrated in FIG. 3.

As compared with the hitherto known methods of measuring the electric characteristics of a shunted portion of an electric circuit and with the known apparatus for measuring the thermal characteristics of aggressive fluids, the present invention offers a number of substantial advantages. As it can be seen from the above disclosure, there is absolutely no need to know the electric characteristics of the shunting elements in order to measure the electric characteristics of the shunted portion. Besides, with the herein disclosed method of measuring the electric characteristics, the accuracy of the measurements is stepped up, since it depends solely on the sensitivity and accuracy of the measuring instruments employed. The herein disclosed method makes it possible to create a new breed of novel measuring apparatus, e.g., those for measuring the thermal characteristics of aggressive fluids, the apparatus being substantially different from those hitherto known. The absence in these novel apparatus of any insulation materials that can be harmed by the aggressive fluids makes these apparatus usable with practically all known aggressive liquids and gases. With these novel apparatus using materials of a very high heat resistivity, they can deal with very high temperatures (for instance, in case of tungsten, the temperatures dealt with may be as high as 3,400°C). The known apparatus, on the other hand, have their range of operational temperatures not above 1,500°C—1,800°C, these being the temperatures at which practically every known insulating material becomes electrically conductive.

The abovedisclosed novel apparatus having no need for protective cases, the temperature-responsive members thereof become highly sensitive and of very low thermal inertia, which is essential in the case of processes where the temperature characteristics vary rapidly. The above statement is particularly true in the case of the apparatus for measuring the pulsations of the flow rate of an aggressive fluid.

The applications of the herein disclosed method of measuring the electric characteristics of a shunted portion of an electric circuit is to no means limited by the apparatus for measuring thermal characteristics. It can be employed wherever it is either impossible or impractical for some reason to disconnect the shunting elements from the working portion of the apparatus.

What is claimed is:

1. A method of measuring the electric characteristics of a shunted portion of an electric circuit, comprising the steps of connecting an adjustable voltage source to the opposite terminals of said shunted portion; connecting an additional adjustable voltage source to one part of the shunting circuit; operating said voltage sources to create such voltage drops across said shunted portion and across said one part of the shunting circuit that no electric current flows through the remaining part of said shunting circuit; and then measuring the electric characteristics of said shunted portion.

2. The method as defined in claim 1, wherein, in the case of direct-current circuits, said voltage drops are made to be equal in value and opposite in direction.

3. The method as defined in claim 1, wherein, in the case of alternating-current circuits, said voltage drops are made to be equal in amplitude and concurrent in phase.

4. An apparatus for measuring the thermal characteristics of aggressive fluids contained within a closed metal vessel having internal and external surfaces, comprising: a temperature-responsive element located within said vessel and having leads electrically connected to said internal surface; a measuring circuit connected to said external surface at respective points disposed adjacent to points of connection of said leads of the element; a compensating circuit including an adjustable voltage source, connected intermediate of one of said points of the connection of said measuring circuit and an arbitrary point on said external surface; and a galvanometer connected intermediate of said arbitrary point and the other one of said points of the connection of said measuring circuit.

5. The apparatus as defined in claim 4, wherein said measuring circuit includes a first reference resistor and a direct-current voltage source, connected in series, whereas said compensating circuit includes a current-measuring instrument and a second reference resistor, a variable one, also connected in series; an electric lead of said compensating circuit being connected to said first resistor at a point of connection of said second resistor to said voltage source, the other electric lead of said compensating circuit being connected to said arbitrary point of the external surface of the vessel, an electric lead of said galvanometer being connected to said external surface of the vessel at a point of connection thereto of said first resistor.

* * * * *